(12) United States Patent
Zhou et al.

(10) Patent No.: US 11,007,968 B2
(45) Date of Patent: May 18, 2021

(54) FIBROUS SUPPORT COMPRISING A SILICONE COATING

(71) Applicant: BLUESTAR SILICONES SHANGHAI CO., LTD., Shanghai (CN)

(72) Inventors: Wenjuan Zhou, Shanghai (CN); Yin Zhang, Shanghai (CN)

(73) Assignee: ELKEM SILICONES SHANGHAI CO., LTD., Shanghai (CN)

( * ) Notice: Subject to any disclaimer, the term of this patent is extended or adjusted under 35 U.S.C. 154(b) by 0 days.

(21) Appl. No.: 15/108,156

(22) PCT Filed: Dec. 31, 2013

(86) PCT No.: PCT/CN2013/090989
§ 371 (c)(1),
(2) Date: Jun. 24, 2016

(87) PCT Pub. No.: WO2015/100571
PCT Pub. Date: Jul. 9, 2015

(65) Prior Publication Data
US 2016/0325705 A1 Nov. 10, 2016

(51) Int. Cl.
| | | |
|---|---|---|
| *C08K 3/22* | (2006.01) |
| *B60R 21/235* | (2006.01) |
| *D06N 3/12* | (2006.01) |
| *D06N 3/18* | (2006.01) |
| *D06N 3/14* | (2006.01) |
| *C09D 183/04* | (2006.01) |
| *B32B 5/02* | (2006.01) |
| *B32B 27/40* | (2006.01) |
| *B32B 25/10* | (2006.01) |
| *B32B 27/12* | (2006.01) |
| *C08K 5/5435* | (2006.01) |
| *C08G 77/12* | (2006.01) |
| *C08G 77/20* | (2006.01) |
| *C08G 77/00* | (2006.01) |
| *C08L 83/04* | (2006.01) |

(52) U.S. Cl.
CPC .............. *B60R 21/235* (2013.01); *B32B 5/02* (2013.01); *B32B 25/10* (2013.01); *B32B 27/12* (2013.01); *B32B 27/40* (2013.01); *C09D 183/04* (2013.01); *D06N 3/12* (2013.01); *D06N 3/14* (2013.01); *D06N 3/183* (2013.01); *B60R 2021/23514* (2013.01); *B60R 2021/23547* (2013.01); *C08G 77/12* (2013.01); *C08G 77/20* (2013.01); *C08G 77/70* (2013.01); *C08K 5/5435* (2013.01); *C08K 2003/2217* (2013.01); *C08L 83/04* (2013.01); *D06N 2211/268* (2013.01); *D06N 2213/03* (2013.01); *D10B 2505/124* (2013.01)

(58) Field of Classification Search
CPC . C08L 83/04; C08K 2003/2217; D06N 3/128; C09D 183/04
See application file for complete search history.

(56) References Cited

U.S. PATENT DOCUMENTS

| | | | |
|---|---|---|---|
| 2,938,009 | A | 5/1960 | Lucas |
| 3,159,601 | A | 12/1964 | Ashby |
| 3,159,602 | A | 12/1964 | Hamilton et al. |
| 3,220,972 | A | 11/1965 | Lamoreaux |
| 3,284,406 | A | 11/1966 | Nelson |
| 3,377,432 | A | 4/1968 | Abbott et al. |
| 3,419,593 | A | 12/1968 | Willing |
| 3,436,366 | A | 4/1969 | Modic |
| 3,445,420 | A | 5/1969 | Kookootsedes et al. |
| 3,697,473 | A | 10/1972 | Polmanteer et al. |
| 3,715,334 | A | 2/1973 | Karstedt |
| 3,814,730 | A | 6/1974 | Karstedt |
| 4,329,273 | A * | 5/1982 | Hardman ................ C08L 83/04 524/862 |
| 4,340,709 | A | 7/1982 | Jeram et al. |
| 5,510,430 | A * | 4/1996 | Rubinsztajn ........... C08G 77/08 525/477 |
| 5,516,938 | A | 5/1996 | Schlaeppi et al. |
| 5,685,347 | A | 11/1997 | Graham et al. |
| 6,200,915 | B1 * | 3/2001 | Adams ................ D06N 3/0063 280/728.1 |

(Continued)

FOREIGN PATENT DOCUMENTS

| | | |
|---|---|---|
| CN | 1798889 A | 7/2006 |
| CN | 1968805 A | 5/2007 |

(Continued)

OTHER PUBLICATIONS

International Search Report dated Sep. 28, 2014 corresponding to International Patent Application No. PCT/CN2013/090989, 2 pages.

*Primary Examiner* — Margaret G Moore
(74) *Attorney, Agent, or Firm* — Dentons US LLP

(57) ABSTRACT

An article is described that includes at least one fibrous support surface coated by at least two successive layers including: an inner layer, in contact with the fibrous support, which is a coating including a silicone elastomer, polyurethane or silicone-polyurethane; and a topcoat outer layer, in contact with the inner layer, which is a coating obtained by crosslinking a composition described herein. The first layer, that is in contact with the fibrous support, is a layer based on a silicone elastomer, polyurethane or silicone-polyurethane composition that was crosslinked. The second layer, that is in contact with the first layer, is a layer obtained by crosslinking as described herein.

16 Claims, No Drawings

(56) References Cited

U.S. PATENT DOCUMENTS

| | | | |
|---|---|---|---|
| 6,354,620 B1 * | 3/2002 | Budden | C09D 183/04 |
| | | | 106/287.13 |
| 6,562,737 B1 * | 5/2003 | Bohin | C08K 7/22 |
| | | | 280/728.1 |
| 6,709,752 B1 * | 3/2004 | James | C09D 183/04 |
| | | | 427/387 |
| 7,642,331 B2 * | 1/2010 | Pouchelon | D06N 3/128 |
| | | | 528/15 |
| 2002/0140218 A1 | 10/2002 | Beasley, Jr. | |
| 2005/0161919 A1 | 7/2005 | Berger et al. | |
| 2005/0205829 A1 * | 9/2005 | Magd | C09D 183/04 |
| | | | 252/8.61 |
| 2006/0142523 A1 * | 6/2006 | Pouchelon | C09D 183/04 |
| | | | 528/15 |
| 2007/0026244 A1 * | 2/2007 | Budden | C08L 83/04 |
| | | | 428/447 |

FOREIGN PATENT DOCUMENTS

| | | |
|---|---|---|
| CN | 101443512 A | 5/2009 |
| CN | 101535429 A | 9/2009 |
| EP | 0057459 A1 | 8/1982 |
| EP | 0188978 A1 | 7/1986 |
| EP | 0190530 A1 | 8/1986 |
| FR | 1126884 A | 12/1956 |
| FR | 1136885 A | 5/1957 |
| FR | 1236505 A | 7/1960 |
| FR | 2372874 A1 | 6/1978 |
| FR | 1528464 A | 6/1986 |
| FR | 2668106 A1 | 4/1992 |
| GB | 1024234 A | 3/1966 |
| GB | 2383304 A | 6/2003 |
| GB | 2397805 A | 8/2004 |

* cited by examiner

FIBROUS SUPPORT COMPRISING A SILICONE COATING

CROSS-REFERENCE TO PRIOR APPLICATIONS

This application is a National Stage of PCT/CN2013/090989, filed Dec. 31, 2013, and designating the United States (published on Jul. 9, 2015, as WO 2015/100571 A1), hereby expressly incorporated by reference in its entirety and assigned to the assignee hereof.

The present invention relates to an article comprising at least one fibrous support surface coated by at least two successive layers comprising:
- at least one inner layer (1), in contact with the fibrous support, which is a coating consisting of a silicone elastomer, polyurethane or silicone-polyurethane; and
- a topcoat outer layer (2), in contact with the inner layer (1), which is a coating obtained by crosslinking a composition according to the invention.

The first layer, that in contact with the fibrous support, is a layer based on a silicone elastomer, polyurethane or silicone-polyurethane composition that were crosslinked. The second layer, that in contact with the first layer, is a layer obtained by crosslinking according to the invention.

PRIOR ART

The general field of the invention is that of the use of silicone compositions, in particular those of the two-component or multicomponent type, that can be crosslinked by polyaddition reactions to produce an elastomer in a thin film as a coating for various fibrous supports, such as, for example, woven, knitted or nonwoven fibrous supports.

Such silicone coatings are generally obtained by coating the fibrous supports then by curing, which proceeds from the polyaddition of the unsaturated (alkenyl, e.g. Si-Vinyl) groups of a polyorganosiloxane to the hydrogens of another polyorganosiloxane.

There is, for many fibrous supports such as, in particular, in the field of airbags, flexible sealing sleeves, clothing or architectural fabrics, a need to confer on the latter, via a silicone coating, both sealing properties and a low friction coefficient so that the surface of the support is not rough and abrasive to the touch. Also added to these properties is the need to obtain a silicone coating having the other properties required, as regards the mechanical properties, such as cohesion, flexibility, suppleness, resistance to fraying, tear strength, and also creasability.

In these applications it is often difficult to obtain a good compromise between these properties.

Currently, many motor vehicles are equipped with an acceleration sensor which measures the decelerations of the vehicle. When the reference value of the deceleration is exceeded, an explosive pellet initiates the combustion of a complementary charge, then that of the solid fuel; this solid fuel is converted to a gas and inflates the cushion. For more details on these individual airbags or inflatable cushions, reference may especially be made to French Patent FR-A-2 668 106.

The latter are generally formed from a cloth of synthetic fiber, for example of polyamide, covered on at least one of its faces by a layer of a silicone composition. These silicone compositions have therefore found a significant outlet in the coating of flexible—woven, knitted or nonwoven—materials used for manufacturing individual airbags for vehicle occupants.

Front airbags may be adaptive and may be deployed in proportion to the violence of the impact. Simple cut and sew airbags have been commonly used for front and side passenger protection in automotive vehicles. The protection system is now increasingly completed by side airbags, or curtains. For this type of airbags, it is important that the airbags remain inflated as long as possible, especially when the motor vehicle undergoes an impact that causes it to undergo a series of rollovers. It is therefore important that these airbags are perfectly gastight from this point of view.

To increase the gastightness of airbags it is possible to use a particular technique for weaving the airbags, a one-piece woven technique (OPW), such as described in Applications GB 2383304 and GB 2397805. Examples of such OPW airbags can also be found in the following U.S. patents and patent publications: U.S. Pat. No. 5,685,347 entitled "Circular Air Bag Made of Two Simultaneously Woven Fabric" which issued to Graham et al. on Nov. 11, 1997; 2005/0161919 entitled "Airbag and Method of Producing an Airbag" invented by Berger et al.; and 2002/0140218 entitled "One-Piece Woven Airbag" invented by Beasley, Jr.

The airbag obtained is then covered, on its outer surface, with a large enough amount of silicone composition so as to ensure good airtightness.

However, the application of such an amount of a silicone composition to the surface of the airbags leads to a rough and abrasive surface being obtained that has a "tacky" feel and a high friction coefficient. Such a surface poses many problems during folding of the airbag, then during its inflation, leading to a difficulty in deploying or a preferential orientation that is not desired during the deployment, an excessive friction with the components of the motor vehicle, such as the glass of the side windows, and also risks of injuries for the passenger whose head or limbs rub against the deployed airbag.

It is therefore necessary to develop a silicone coating, which makes it possible to provide the fibrous supports, especially for airbags, with the necessary gas tightness, which is not rough and abrasive and that has a softer feel and a low friction coefficient.

INVENTION

The Applicant has brought to light a silicone topcoat for fibrous supports that overcomes the aforementioned drawbacks.

The present invention thus relates to an article comprising at least one fibrous support surface coated by at least two successive layers comprising:
- at least one inner layer (1), in contact with the fibrous support, which is a coating consisting of a silicone elastomer, polyurethane or silicone-polyurethane; and
- a topcoat outer layer (2), in contact with the inner layer (1), which is a coating obtained by crosslinking a composition consisting of:

(A) at least 25% by weight, relative to the total weight of said composition, of at least one linear polyorganosiloxane A having per molecule:
  a) at least two vinyldimethylsiloxane end units $M^{Vi}$,
  b) at least one vinylmethylsiloxane unit $D^{Vi}$, and
  c) a degree of polymerization "DP" which is the number of repeating Si—O—Si units in the polymer over 150; and most preferably 150<DP<180;

(B) at least one polyorganosiloxane B terminated at each of the chain ends by a vinyldimethylsiloxane unit;

(C) at least one polyorganosiloxane C having, per molecule, at least two hydrogen atoms bonded to the silicon;

(D) at least one platinum-based crosslinking catalyst D;
(E) at least 35% by weight, relative to the total weight of said composition, of talc E;
(F) up to 15% by weight, relative to the total weight of said composition, of at least one polyorganosiloxane resin F comprising at least one alkenyl group;
(G) at least one crosslinking inhibitor G;
(H) up to 5% by weight, relative to the total weight of said composition, of at least one adhesion promoter H which is an organosilicon compound comprising at least one epoxy radical;
(I) optionally up to 10% by weight, relative to the total weight of said composition, of a filler I; and
(J) optionally at least one additive J.

The silicone coating obtained is suitable for conferring excellent mechanical qualities on the fibrous supports, such as cohesion, flexibility, suppleness, resistance to fraying, tear strength and combing strength, and also creasability, while obtaining an excellent compromise with regard to the gastightness, especially airtightness, properties and abrasion resistance properties (scrub test) and friction coefficient properties representative of a low friction coefficient. The solution of the invention furthermore makes it possible to obtain fibrous supports that also have the other expected and required properties such as good fire resistance and temperature resistance.

Owing to the properties and characteristics indicated above, it is possible to produce individual airbags for the occupants of a vehicle from open-weave fabrics as described above, in particular polyamide or polyester fabrics, which once coated have a good friction coefficient and good combing strength and tear strength, furthermore possessing optimal properties, especially impermeability, heat protection, porosity, foldability and fire resistance properties. This makes it possible to produce higher-performing and less expensive airbags than the airbags produced from the coated fabrics of the prior art.

The solution according to the invention also allows a better control of the desired thickness of silicone coating on the fibrous support, thus guaranteeing the best performances possible as regards impermeability and touch characteristics.

DETAILED SUMMARY OF THE INVENTION

The present invention thus relates to an article comprising at least one fibrous support surface coated by at least two successive layers comprising:
at least one inner layer (1), in contact with the fibrous support, which is a coating consisting of a silicone elastomer, polyurethane or silicone-polyurethane; and
a topcoat outer layer (2), in contact with the inner layer (1), which is a coating obtained by crosslinking a composition consisting of:
(A) at least 25% by weight, relative to the total weight of said composition, of at least one linear polyorganosiloxane A having per molecule:
  a) at least two vinyldimethylsiloxane end units $M^{Vi}$,
  b) at least one vinylmethylsiloxane unit $D^{Vi}$, and
  c) a degree of polymerization "DP" which is the number of repeating Si—O—Si units in the polymer over 150; and most preferably 150<DP<180;
(B) at least one polyorganosiloxane B terminated at each of the chain ends by a vinyldimethylsiloxane unit;
(C) at least one polyorganosiloxane C having, per molecule, at least two hydrogen atoms bonded to the silicon;
(D) at least one platinum-based crosslinking catalyst D;
(E) at least 35% by weight, relative to the total weight of said composition, of talc E; and most preferably from 35% by weight to 60% by weight relative to the total weight of said composition,
(F) up to 15% by weight, relative to the total weight of said composition, of at least one polyorganosiloxane resin F comprising at least one alkenyl group;
(G) at least one crosslinking inhibitor G;
(H) up to 5% by weight, relative to the total weight of said composition, of at least one adhesion promoter H which is an organosilicon compound comprising at least one epoxy radical;
(I) optionally up to 10% by weight, relative to the total weight of said composition, of a filler I; and
(J) optionally at least one additive J.

The present invention targets any product capable of being obtained by deposition onto a fibrous support of the aforementioned silicone layers. As examples, mention may be made of the airbags used for protecting the occupants of a vehicle, glass braids, such as the fiberglass sheaths for thermal and dielectric protection for electrical wires, conveyor belts, fire-resistant fabrics, thermal insulation, compensators, such as flexible sealing sleeves for pipework, clothing or else flexible materials intended to be used in interior or exterior textile architecture, such as tarpaulins, tents, stands and marquees.

The fibrous supports intended to be coated may be, for example, woven, nonwoven or knit fabrics or more generally any fibrous support chosen from the group of materials comprising: glass, silica, metals, ceramic, silicon carbide, carbon, boron, natural fibers such as cotton, wool, hemp, linen, artificial fibers such as viscose, or cellulose fibers, synthetic fibers such as polyesters, polyamides, polyacrylics, chlorofibers, polyolefins, polyimides, synthetic rubbers, polyvinyl alcohol, aramids, fluorofibers, phenolics, etc.

The airbags preferably used within the context of the invention are one-piece woven airbags, such as mentioned in Applications GB 2383304 and GB 2397805. These airbags may be based on various fibrous materials, such as for example polyamides or polyesters. Other suitable OPW airbags can also be found in the following U.S. patents and patent publications: U.S. Pat. No. 5,685,347 entitled "Circular Air Bag Made of Two Simultaneously Woven Fabric" which issued to Graham et al. on Nov. 11, 1997; 2005/0161919 entitled "Airbag and Method of Producing an Airbag" invented by Berger et al.; and 2002/0140218 entitled "One-Piece Woven Airbag" invented by Beasley, Jr.

It is possible to use a wide variety of two-component or one-component organopolysiloxane compositions that crosslink at ambient temperature or at high temperature via polyaddition reactions, mainly by reaction of hydrosilyl groups with alkenylsilyl groups, generally in the presence of a metallic catalyst, preferably a platinum catalyst. These compositions are described, for example, in U.S. Pat. Nos. 3,220,972, 3,284,406, 3,436,366, 3,697,473 and 4,340,709.

According to another embodiment, the linear polyorganosiloxane A has per molecule:
  a) at least two vinyldimethylsiloxane end units $M^{Vi}$,
  b) at least one vinylmethylsiloxane unit $D^{Vi}$,
  c) at least 140 dimethylsiloxane units D and
  d) a degree of polymerization "DP" which is the number of repeating Si—O—Si units in the polymer over 150; and most preferably 150<DP<180

The dynamic viscosity at 25° C. of the linear polyorganosiloxane A is generally comprised between 300 mPa·s and 600 mPa·s.

All the viscosities in question in the present document correspond to a dynamic viscosity value which is measured, in a manner that is known per se, at 25° C., with a Brookfield type device.

According to a preferred embodiment of the invention, the linear polyorganosiloxane A is of the following formula:

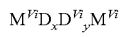

With:
Vi=vinyl group,
$M^{Vi}$=(Vi) $(CH_3)_2 SiO_{1/2}$,
$D_x$=$(CH_3)_2 SiO_{2/2}$ and x is an integer number,
$D^{Vi}_y$=(Vi) $(CH_3) SiO_{2/2}$ and y is an integer number,
and x+y>150 and most preferably 150<x+y<180.

The polyorganosiloxane B terminated at each of the chain ends by a vinyldimethylsiloxane unit $M^{Vi}$ may have other units of formula:

$(R)_2 SiO_{2/2}$ in which R symbols, are identical or different, and represent an organic radical selected from the group consisting of: methyl, ethyl, propyl, isopropyl, butyl, isobutyl, n-pentyl, t-butyl, chloromethyl, dichloro-methyl, α-chloroethyl, α,β-dichloroethyl, fluoromethyl, difluoromethyl, α,β-difluoroethyl, 3,3,3-trifluoropropyl trifluorocyclopropyl, 4,4,4-trifluorobutyl, 3,3,4,4,5,5-hexafluoropentyl, β-cyanoethyl, β-cyanopropyl, phenyl, p-chlorophenyl, m-chlorophenyl, 3,5-dichlorophenyl, trichlorophenyltetrachlorophenyl, o-, p- or m-tolyl, α,α,α-trifluorotolyl, and xylyl groups such as 2,3-dimethylphenyl or 3,4-dimethylphenyl groups.

The dynamic viscosity at 25° C. of the linear polyorganosiloxane B is generally comprised between 100 mPa·s and 600 000 mPa·s when it is a silicone oil and over 600 000 mPa·s and up to 3 million mPa·s when it is a silicone gum.

The polyorganosiloxane C generally comprises siloxyl units of formula:

$$H_d L_e SiO\frac{4-(d+e)}{2} \quad (C-1)$$

in which:
the groups L, which may be identical or different, each represent an alkyl group containing from 1 to 8 carbon atoms inclusive, advantageously chosen from methyl, ethyl, propyl and 3,3,3-trifluoropropyl groups, or an aryl group, advantageously chosen from groups and advantageously a xylyl, tolyl or phenyl radical,
d is 1 or 2, e is 0, 1 or 2, the sum d+e is equal to 1, 2 or 3, and
optionally, at least some of the other units being units of mean formula:

$$L_g SiO\frac{4-g}{2} \quad (C-2)$$

in which:
the groups L, which may be identical or different, each represent an alkyl group containing from 1 to 8 carbon atoms inclusive, advantageously chosen from methyl, ethyl, propyl and 3,3,3-trifluoropropyl groups, or an aryl group, advantageously chosen from groups and advantageously a xylyl, tolyl or phenyl radical and g is equal to 0, 1, 2 or 3.

The dynamic viscosity at 25° C. of this polyorganosiloxane C is at least equal to 10 mPa·s and preferably between 20 and 1000 mPa·s. The polyorganosiloxane C may be formed solely from units of formula (C-1) or may also comprise units of formula (C-2). The polyorganosiloxane C may have a linear, branched, cyclic or network structure.

Examples of units of formula (C-1) are $H(CH_3)_2 SiO_{1/2}$, $H(CH_3) SiO_{2/2}$ and $H(C_6H_5) SiO_{2/2}$.

The examples of units of formula (C-2) are $(CH_3)_3 SiO_{1/2}$, $(CH_3)_2 SiO_{2/2}$ and $(CH_3) (C_6H_5) SiO_{2/2}$.

Examples of polyorganosiloxanes C are linear and cyclic compounds, for instance:
dimethylpolysiloxanes containing hydrogenodimethylsilyl end groups,
copolymers containing (dimethyl) (hydrogenomethyl) polysiloxane units containing trimethylsilyl end groups,
copolymers containing (dimethyl) (hydrogenomethyl) polysiloxane units containing hydrogenodimethylsilyl end groups,
hydrogenomethylpolysiloxanes containing trimethylsilyl end groups, or
cyclic hydrogenomethylpolysiloxanes.

The polyorganosiloxanes C may optionally be a mixture of a dimethylpolysiloxane containing hydrogenodimethylsilyl end groups and of a polyorganosiloxane comprising at least three hydrogenosiloxyl group.

The ratio of the number of hydrogen atoms linked to silicon in the polyorganosiloxane C to the total number of groups containing alkenyl unsaturation of the polyorganosiloxanes A, B and F is between 0.4 and 10 and preferably between 0.6 and 5.

In particular, a polyorganosiloxane C corresponding to a poly(dimethyl)(hydromethyl)siloxane oil terminated at each of the chain ends by a $(CH_3)_2 HSiO_{1/2}$ unit ($M^H$) is preferred.

Catalyst D consisting of at least one metal, or compound, from the platinum group are well known. The platinum group metals are those known under the name of platinoids, a term that encompasses, besides platinum, ruthenium, rhodium, palladium, osmium and iridium. Preferably, platinum and rhodium compounds are used. It is possible, in particular, to use the complexes of platinum and of an organic product described in U.S. Pat. Nos. 3,159,601, 3,159,602, 3,220,972 and European Patents EP-A-0 057 459, EP-A-0 188 978 and EP-A-0 190 530, the (Karstedt) complexes of platinum and of vinylorganosiloxanes described in U.S. Pat. Nos. 3,419,593, 3,715,334, 3,377,432 and 3,814,730. The catalyst generally preferred is platinum. In this case, the weight amount of catalyst D, calculated by weight of platinum metal, is generally between 2 and 400 ppm, preferably between 5 and 200 ppm based on the total weight of the polyorganosiloxanes A, B and F.

Talc E is a natural mineral, with a sheet silicate structure. It has a platy morphology. Talc is a hydrated magnesium covered silica with the chemical formula of $Mg_3Si_4O_{10}(OH)_2$. It is a white, apple green, gray powder with luster pearly or greasy, and a Mohs hardness of 1 to 1.5

Polyorganosiloxane resin F comprising at least one alkenyl group are polyorganosiloxane resin comprising at least one, preferably at least two, alkenyl. These silicone resins are branched POS polymers that are well known and are commercially available. They have, per molecule, at least two different units chosen from those of formula $R^1_3 SiO_{1/2}$ (M unit), $R^1_2 SiO_{2/2}$ (D unit), $R^1 SiO_{3/2}$ (T unit) and $SiO_{4/2}$ (Q unit). The radicals $R^1$ are identical or different and are chosen from linear or branched alkyl radicals, vinyl, phenyl and/or 3,3,3-trifluoropropyl radicals. At least some of the radicals $R^1$ are vinyl groups (Vi), with a weight content of Vi in particular between 0.1 and 2%. Preferably, the alkyl radicals have from 1 to 6 carbon atoms inclusive. More particularly, mention may be made, as alkyl radicals $R^1$, of methyl, ethyl, isopropyl, tert-butyl and n-hexyl radicals. The vinyl groups are borne by the M, D or T units. As an example, mention may be made of the vinyl MDQ resins, such as $MD^{Vi}Q$, or else $MM^{Vi}Q$ resins ($D^{Vi}$ is represented by the formula ($R^1{}_2SiO_{2/2}$) for which one radical $R^1$ corresponds to a vinyl residue; $M^{Vi}$ is represented by the formula $R^1{}_3SiO_{1/2}$ for which one radical $R^1$ corresponds to a vinyl residue).

In a preferred embodiment, the polyorganosiloxane resin F is selected from the group consisting of:

a) a $MD^{Vi}Q$ resin with:
$M=(CH_3)_3SiO_{1/2}$,
$D^{Vi}=(CH_3)(R^1)SiO_{2/2}$, and
$Q=SiO_{4/2}$;

b) a $MM^{Vi}Q$ resin with:
$M=(CH_3)_3SiO_{1/2}$,
$M^{Vi}=(CH_3)_2(R^1)SiO_{1/2}$, and
$Q=SiO_{4/2}$;

in which $R^1$ corresponds to a vinyl radical.

Optionally, the said polyorganosiloxane resin F could be in solution in a polydimethylsiloxane oil terminated at each of the chain ends by a $(CH_3)_2ViSiO_{1/2}$ unit.

For the crosslinking inhibitor G, it is possible to use those conventionally employed in polyaddition crosslinking reactions in the silicone field. They may especially be chosen from the following compounds:

polyorganosiloxanes substituted by at least one alkenyl which may optionally be present in cyclic form, tetramethylvinyltetrasiloxane being particularly preferred;

organic phosphines and phosphites;

unsaturated amides;

alkylated maleates; and acetylenic alcohols.

As acetylenic alcohols (cf. FR-B-1 528 464 and FR-A-2 372 874), which are among the preferred thermal blockers for the hydrosilylation reaction, it is especially possible to choose 1-ethynyl-1-cyclohexanol, 3-methyl-1-dodecyn-3-ol, 3,7,11-trimethyl-1-dodecyn-3-ol, 1,1-diphenyl-2-propyn-1-ol, 3-ethyl-6-ethyl-1-nonyn-3-ol, 2-methyl-3-butyn-2-ol, 3-methyl-1-penta-decyn-3-ol, diallyl maleate or derivatives of diallyl maleate.

Such an inhibitor may be present in an amount of at most 3000 ppm, preferably in an amount of 100 to 1000 ppm relative to the total weight of the polyorganosiloxanes A, B and F.

The adhesion promoter H is an organosilicon compound comprising at least one epoxy radical.

As regards to adhesion promoter H, it is envisaged in accordance with the invention to choose it from:

a) either the products (IV.2a) corresponding to the following general formula:

(IV.2a)

in which formula:
$R^6$ and $R^7$ are $C_1$ to $C_4$ alkyl radicals,
y is equal to 0, 1, 2 or 3, and X being defined by the following formula:

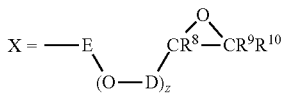

with:
E and D, which are identical or different radicals chosen from linear or branched C1-C4 alkyls,
z, which is equal to 0 or 1,
$R^8$, $R^9$ and $R^{10}$, which are identical or different radicals representing hydrogen or a $C_1$ to $C_4$ alkyl radicals, and b) or the products (IV.2b) consisting of epoxy-functional polydiorganosiloxanes comprising:

(i) at least one siloxyl unit of formula:

$$X_p G_q SiO\frac{4-(p+q)}{2} \qquad (IV.2b1)$$

in which formula:
X is the radical as defined above for formula (IV.2a),
G is an alkyl groups containing from 1 to 8 carbon atoms inclusive, optionally substituted with at least one halogen atom, or an aryl groups,
p=1 or 2,
q=0, 1 or 2,
p+q=1, 2 or 3, and (2i) optionally at least one siloxyl unit of formula:

$$G_r SiO\frac{4-r}{2} \qquad (IV.2b2)$$

in which formula G has the same meaning as above and r is equal to 0, 1, 2 or 3.

The most preferred adhesion promoter H is 3-glycidoxypropyltrimethoxysilane (GLYMO).

As filler I, it may be possible to use a silica with a BET specific surface area of at least 50 m²/g. The fillers are advantageously processed by treatment with various organosilicon compounds usually used for this purpose. Thus, these organosilicon compounds may be organochlorosilanes, diorganocyclopolysiloxanes, hexaorganodisiloxanes, hexaorganodisilazanes or diorganocyclopolysilazanes (French patents FR-A-1 126 884, FR-A-1 136 885 and FR-A-1 236 505, and British patent GB-A-1 024 234).

According to the invention the composition may also comprise as filler I a standard semi-reinforcing or packing filler such as diatomaceous earth, ground quartz, carbon black, titanium dioxide, aluminium oxide, hydrated alumina, expanded vermiculite, non-expanded vermiculite, calcium carbonate that may has undergone a compatibilization treatment, zinc oxide, mica, iron oxide, barium sulfate, slaked lime, etc. Calcium carbonate eventually surface treated by known agent (such stearic acids, . . . ) is the most preferred.

In a manner that is known per se, the composition according to the invention may further comprise an additive J for example solvent such as tetradecene, stabilizer such as metaphosphoric acid derivatives in polydimethylsiloxane, colorants, flame retardants, bactericides, mineral or organic pigments and also those for improving the fire resistance, such as compounds containing a phenyl group substituted with an amino (secondary or tertiary) group. Examples of such additives are found in the reference U.S. Pat. No.

5,516,938. The useful amounts of such additives are generally between 0.01 and 1 part by weight relative to the total amount of the composition.

The composition according to the invention makes it possible to obtain fabrics coated with thin water-repellent layers of silicone elastomers that have good mechanical properties of suppleness, tear strength and resistance to fraying and that release little heat in the case of combustion.

The inner layer (1) in contact with the fibrous support is a coating consisting of a silicone elastomer, polyurethane or silicone-polyurethane. Various types of these compositions may be used.

It is possible to use a wide variety of multicomponent, two-component or one-component organopolysiloxane compositions that crosslink at ambient temperature or at high temperature via, in particular, polyaddition, hydrosilylation or radical reactions to produce an elastomer. As a polyaddition reaction, mention may especially be made of the reaction of hydrosilyl groups with alkenylsilyl groups, generally in the presence of a metal catalyst, preferably a platinum catalyst (see, for example, U.S. Pat. Nos. 3,220,972, 3,284,406, 3,436,366, 3,697,473 and 4,340,709).

Mention may especially be made of a silicone elastomer composition obtained by crosslinking a polyorganosiloxane mixture capable of crosslinking via polyaddition reactions comprising at least:
one polyorganosiloxane having, per molecule, at least two $C_2$-$C_6$ alkenyl groups bonded to the silicon;
one polyorganosiloxane having, per molecule, at least two hydrogen atoms bonded to the silicon; and
in the presence of an effective amount of platinum-based crosslinking catalyst.

These polyorganosiloxanes may be the same as those described previously for the outer layer (2). The composition may also comprise various additives used for the formation of the outer layer (2).

The silicone elastomer composition preferably comprises reinforcing fillers, such as those described previously, especially polyorganosiloxane resins, and/or silica that has preferably been treated, more preferably in proportions between 5 and 50% of the inner layer.

Another subject of the present invention is a process for coating a fibrous support, in which:
deposited on the surface of a fibrous support is a silicone elastomer composition that can be crosslinked by polyaddition, hydrosilylation or radical reactions; and it is optionally crosslinked to form the inner layer (1), and
deposited on the inner layer (1) is the composition according to the invention and as described above that can be crosslinked by polyaddition reaction defined previously, and it is crosslinked so as to form the outer layer (2).

The deposition steps are advantageously carried out by coating. The coating step may especially be carried out using a knife, in particular a knife-over-roll, a floating knife or a knife-over-blanket, by transfer, by padding, that is to say by squeezing between two rolls, or else by lick roll, rotary machine, reverse roll. For application of the outer layer an engraved roll or a transfer roll are particularly useful.

Next crosslinking are carried out, preferably by hot air or electromagnetic radiation, for example infrared radiation, especially for 10 seconds to 5 minutes, preferably from 10 to 60 seconds, at a crosslinking temperature without exceeding the degradation temperature of the fibrous support.

It should be noted that it is possible to crosslink or not to crosslink the composition applied to form the inner layer (1) before depositing the composition for the outer layer (2). In the case where the composition applied to form the inner layer (1) is not crosslinked, its crosslinking will be carried out when the crosslinking of the composition for forming the outer layer (2) is carried out.

The amount of silicone elastomer composition applied is such that it enables the formation of an inner layer (1) having a surface density between 10 and 200 $g/m^2$, preferably between 40 and 120 $g/m^2$. Generally, a final deposited thickness after crosslinking between 30 and 70 µm will be aimed for.

The amount of the composition according to the invention that can be crosslinked by polyaddition reaction applied is such that it allows the formation of an outer layer (2) having a surface density between and 40 $g/m^2$, preferably between 10 and 35 $g/m^2$. Generally, a final deposited thickness after crosslinking between 1 and 50 µm.

In the context of one-piece woven airbags, the silicone coating that is the subject of the invention is formed on the outer surface of said airbag, in contact with the user or the various vehicle components.

Another embodiment of the invention concerns an article characterized in that the fibrous support is an airbag used for protecting the occupants of a vehicle.

Finally, the fibrous support is a one-piece woven airbag for protecting the occupants of a vehicle; and characterized in that the silicone elastomer coating is located on the outer surface of said airbag, in contact with the user or the various components of the vehicle.

A specific language is used in the description so as to facilitate the understanding of the principle of the invention. It should nevertheless be understood that no limitation to the scope of the invention is envisaged by the use of this specific language. Modifications, improvements and perfections may especially be envisaged by a person skilled in the art in question on the basis of his own general knowledge.

The term "and/or" includes the meanings "and", "or", and also all the other possible combinations of the elements connected to this term.

Other details or advantages of the invention will appear more clearly in light of the examples given below solely by way of indication.

EXPERIMENTAL SECTION

In these examples, the dynamic viscosity at 25° C. was measured using a Brookfield viscometer.

A composition according to the invention was prepared by mixing a bicomponent RTV-2 described in Table 1 and as followed: 4 parts by weight of formulation A and one part by weight of formulation XL.

TABLE 1

| Composition of bi-component RTV-2 | |
|---|---|
| | Parts by weight |
| Formulation A | |
| polyorganosiloxane A: $M^{Vi} D_{153} D^H_8 M^{Vi}$ | 40.81 |
| Filler E: talc | 54.05 |
| Filler I: calcium carbonate (reference ALBACAR © 5970, that has not been the subject of a compatibilization treatment having a $d_{50}$ particle size of 2 µm. | 2.70 |
| GLYMO | 1.80 |
| Silcolease Pt catalyst sold by Bluestar Silicones | 0.63 |

TABLE 1-continued

Composition of bi-component RTV-2

| | Parts by weight |
|---|---|
| Formulation XL | |
| Mixture of 70% by weight of MM$^{vi}$Q resin F in solution in 12% by weight of a polydimethylsiloxane oil B terminated at each of the chain ends by a (CH$_3$)$_2$ViSiO$_{1/2}$ unit, having a viscosity of 10 000 mPa.s and 18% by weight of an organic solvent (tetradecene derivative) J | 58.12 |
| Poly(dimethyl)(hydromethyl)siloxane oil C terminated at each of the chain ends by a (CH$_3$)$_3$SiO$_{1/2}$ with a dynamic viscosity at 25° C. of 34 mPa.s | 32.48 |
| Additive J stabilizer metaphosphoric acid derivatives in polydimethylsiloxane | 0.02 |
| polyorganosiloxane B: gum = Polydimethyl with methylvinylsiloxane end groups gum | 8.99 |
| Crosslinking inhibitor G: 1-ethynylcyclohexanol (ECH) | 0.39 |

Example 2

Preparation of Coated Woven Fabrics

The woven fabric was a PET fabric. It was coated with an inner layer (1) of RTV-2 TCS 7750 silicone sold by Bluestar Silicones (coating weight: 60 g/m²; curing condition: 150° C. for 15 min by press machine and this was repeated twice).

TABLE 2

Physical properties of the inner layer (1).

| | Mechanical properties of the inner layer (1) |
|---|---|
| Tensile strength at Break (Mpa) | 5.30 |
| Elongation at Break (%) ISO 37 | 679 |
| Modulus 100% | 0.489 |
| Tear Strength (KN/m) ASTM D 624 A | 14.11 |
| Shore A Hardness ASTM D 2240 | 20.60 |

Then, mixing of the amounts of crosslinking and catalyzing preparations indicated in table 1, was carried out during the formation of the coating bath, before application to the coated woven fabric.

The coating bath was applied to the fabric (from 10 to 15 g/m²) that had already been coated by the inner layer (1) of silicone with Meyer bar so as to form the outer layer (2) (topcoat). Next, the coated woven fabric was passed into a ventilated heating chamber (curing conditions 160° C. for 2 minutes or 180° C. for 20 s).

The physical properties of the topcoat (outer layer (2) were measured and quoted in Table 3. (Results are obtained by following ISO 8295:2004 or ASTM-D1894)

TABLE 3

Physical properties of the topcoat (outer layer (2))

| Coefficient of friction (COF) | 160° C. for 2 min | 180° C. for 20 s |
|---|---|---|
| Kd (dynamic friction force) | 0.195 | 0.229 |
| Kf (static friction force) | 0.210 | 0.233 |

The invention claimed is:

1. An article comprising at least one fibrous support surface coated by at least two successive layers comprising:
   at least one inner layer (1), in contact with the at least one fibrous support, which is a coating comprising a silicone elastomer, polyurethane or silicone-polyurethane; and
   a topcoat outer layer (2), in contact with the inner layer (1), which is a coating obtained by crosslinking a composition comprising:
   (A) at least 25% by weight, relative to the total weight of said composition, of at least one linear polyorganosiloxane A having per molecule:
      a) at least two vinyldimethylsiloxane end units M$^{Vi}$,
      b) at least one vinylmethylsiloxane unit D$^{Vi}$, and
      c) a degree of polymerization "DP," which refers to a number of repeating Si—O—Si units in the polymer, of over 150;
   (B) at least one linear polyorganosiloxane B terminated at each of the chain ends by a vinyldimethylsiloxane unit (CH$_3$)$_2$ViSiO$_{1/2}$, and further comprising at least one repeating unit D$_z$=(R)$_2$SiO$_{2/2}$, wherein R groups may be the same or different, and are independently selected from the group consisting of methyl, ethyl, propyl, isopropyl, butyl, isobutyl, n-pentyl, t-butyl, chloromethyl, dichloro-methyl, α-chloroethyl, α,β-dichloroethyl, fluoromethyl, difluoromethyl, α,β-difluoroethyl, 3,3,3-trifluoropropyl trifluorocyclopropyl, 4,4,4-trifluorobutyl, 3,3,4,4,5,5-hexafluoropentyl, β-cyanoethyl, β-cyanopropyl, phenyl, p-chlorophenyl, m-chlorophenyl, 3,5-dichlorophenyl, trichlorophenyltetrachlorophenyl, o-, p- or m-tolyl, α,α,α-trifluorotolyl, 2,3-dimethylphenyl and 3,4-dimethylphenyl;
   (C) at least one polyorganosiloxane C having, per molecule, at least two hydrogen atoms bonded to the silicon;
   (D) at least one catalyst D comprising at least one metal, or compound, from the platinum group;
   (E) at least 35% by weight, relative to the total weight of said composition, of at least one filler E, wherein the at least one filler E is talc;
   (F) from 8% by weight to 20% by weight, relative to the total weight of said composition, of at least one branched polyorganosiloxane resin F, wherein the branched polyorganosiloxane resin F comprises at least two different repeating units selected from R$^1_3$SiO$_{1/2}$, R$^1_2$SiO$_{2/2}$, R$^1$SiO$_{3/2}$ and SiO$_{4/2}$, wherein R$^1$ of the repeating units is the same or different and is selected from the group consisting of linear or branched alkyl radicals, vinyl, phenyl and 3,3,3-trifluoropropyl radicals, and wherein at least some of R$^1$ groups are vinyl radicals;
   (G) at least one crosslinking inhibitor G;
   (H) up to 5% by weight, relative to the total weight of said composition, of at least one adhesion promoter H, which is an organosilicon compound, comprising at least one epoxy radical;

(I) optionally up to 10% by weight, relative to the total weight of the composition, of a filler I; and (J) optionally at least one additive J, and wherein Vi=a vinyl group.

2. The article as claimed in claim 1, wherein the at least one linear polyorganosiloxane A is of the following formula:

$$M^{Vi}DxD^{vi}_yM^{vi}$$

wherein Vi=vinyl group, $$M^{vi}=(Vi)(CH_3)_2SiO_{1/2}$$

$Dx=(CH_3)_2SiO_{2/2}$ and x is an integer number, $D^{Vi}=(Vi)(CH_3)_2SiO_{2/2}$ and y is an integer number, and x+y>150.

3. The article as claimed in claim 1, wherein the at least one polyorganosiloxane resin F is selected from the group consisting of:

a) a $MD^{Vi}Q$ resin with:
$M=(CH_3)_3SiO_{1/2}$,
$D^{Vi}=(CH_3)(R^1)SiO_{2/2}$, and
$Q=SiO_{4/2}$;

b) a $MM^{Vi}Q$ resin with:
$M=(CH_3)_3SiO_{1/2}$,
$M_{Vi}=(CH_3)_2(R^1)SiO_{1/2}$, and
$Q=SiO_{4/2}$;

in which $R^1$ corresponds to a vinyl radical.

4. The article as claimed in claim 1, wherein the at least one adhesion promoter H is 3-glycidoxypropyltrimethoxysilane (GLYMO).

5. The article as claimed in claim 1, wherein the at least one fibrous support is an airbag used for protecting an occupant of a vehicle.

6. The article as claimed in claim 1, wherein the at least one fibrous support is a one-piece woven airbag for protecting an occupant of a vehicle;

and the silicone elastomer coating is located on an outer surface of the airbag, in contact with the occupant or various components of the vehicle.

7. The article as claimed in claim 1, wherein the DP is greater than 150 and less than 180.

8. The article as claimed in claim 2, wherein x+y is greater than 150 and less than 180.

9. A method of making an article, the method comprising making the article to comprise at least one fibrous support surface and coating the at least one fibrous support surface with at least two successive layers, wherein the at least two successive layers comprise:

at least one inner layer (1), in contact with the fibrous support, which is a coating comprised of a silicone elastomer, polyurethane or silicone-polyurethane; and a topcoat outer layer (2), in contact with the inner layer (1), which is a coating obtained by crosslinking a composition comprised of:

(A) at least 25% by weight, relative to the total weight of said composition, of at least one linear polyorganosiloxane A having per molecule:

a) at least two vinyldimethylsiloxane end units $M^{Vi}$, b) at least one vinylmethylsiloxane unit $D^{Vi}$, and c) a degree of polymerization "DP," which refers to a number of repeating Si—O—Si units in the polymer, of over 150;

(B) at least one linear polyorganosiloxane B terminated at each of the chain ends by a vinyldimethylsiloxane unit $(CH_3)_2ViSiO_{1/2}$, and further comprising at least one repeating unit $D_z=(R)_2SiO_{2/2}$, wherein R groups may be the same or different, and are independently selected from the group consisting of methyl, ethyl, propyl, isopropyl, butyl, isobutyl, n-pentyl, t-butyl, chloromethyl, dichloro-methyl, α-chloroethyl, α,β-dichloroethyl, fluoromethyl, difluoromethyl, α,β-difluoroethyl, 3,3,3-trifluoropropyl trifluorocyclopropyl, 4,4,4-trifluorobutyl, 3,3,4,4,5,5-hexafluoropentyl, β-cyanoethyl, β-cyanopropyl, phenyl, p-chlorophenyl, m-chlorophenyl, 3,5-dichlorophenyl, trichlorophenyltetrachlorophenyl, o-, p- or m-tolyl, α,α,α-trifluorotolyl, 2,3-dimethylphenyl and 3,4-dimethylphenyl;

(C) at least one polyorganosiloxane C having, per molecule, at least two hydrogen atoms bonded to the silicon;

(D) at least one catalyst D comprising of at least one metal, or compound, from the platinum group;

(E) at least 35% by weight, relative to the total weight of the composition, of at least one filler E, wherein the at least one filler E is talc;

(F) from 8% by weight to 20% by weight, relative to the total weight of said composition, of at least one branched polyorganosiloxane resin F, wherein the branched polyorganosiloxane resin F comprises at least two different repeating units selected from $R^1_3SiO_{1/2}$, $R^1_2SiO_{2/2}$, $R^1SiO_{3/2}$ and $SiO_{4/2}$, wherein $R^1$ of the repeating units is the same or different and is selected from the group consisting of linear or branched alkyl radicals, vinyl, phenyl and 3,3,3-trifluoropropyl radicals, and wherein at least some of $R^1$ groups are vinyl radicals;

(G) at least one crosslinking inhibitor G;

(H) up to 5% by weight, relative to the total weight of said composition, of at least one adhesion promoter H, which is an organosilicon compound, comprising at least one epoxy radical;

(I) optionally up to 10% by weight, relative to the total weight of said composition, of a filler I; and (J) optionally at least one additive J, and wherein Vi=a vinyl group.

10. The method according to claim 9, wherein the at least one linear polyorganosiloxane A is:

$$M^{Vi}DxD^{vi}_yM^{vi}$$

wherein Vi=vinyl group, $$M^{vi}=(Vi)(CH_3)_2SiO_{1/2}$$

$Dx=(CH_3)_2SiO_{2/2}$ and x is an integer number, $D^{Vi}=(Vi)(CH_3)_2SiO_{2/2}$ and y is an integer number, and x+y>150.

11. The method according to claim 9, wherein the at least one polyorganosiloxane resin F is selected from the group consisting of:

a) a $MD^{Vi}Q$ resin with:
$M=(CH_3)_3SiO_{1/2}$,
$D^{Vi}=(CH_3)(R^1)SiO_{2/2}$, and
$Q=SiO_{4/2}$;

b) a $MM^{Vi}Q$ resin with:
$M=(CH_3)_3SiO_{1/2}$,
$M^{Vi}=(CH_3)_2(R^1)SiO_{1/2}$, and
$Q=SiO_{4/2}$;

in which $R^1$ corresponds to a vinyl radical.

12. The method according to claim 9, wherein the at least one adhesion promoter H is 3-glycidoxypropyltrimethoxysilane (GLYMO).

13. The method according to claim 9, wherein the at least one fibrous support is an airbag used for protecting an occupant of a vehicle.

14. The method according to claim 9, wherein the at least one fibrous support is a one-piece woven airbag for protecting an occupant of a vehicle; and the silicone elastomer coating is located on an outer surface of the airbag, in contact with the occupant or various components of the vehicle.

15. The article according to claim 1, wherein a material of the fibrous support is selected from the group consisting of glass, silica, metals, ceramic, silicon carbide, carbon, boron, natural fibers, artificial fibers, synthetic fibers, synthetic rubbers, polyvinyl alcohol, aramids, fluorofibers and phenolics.

16. The method according to claim 9, wherein a material of the fibrous support is selected from the group consisting of glass, silica, metals, ceramic, silicon carbide, carbon, boron, natural fibers, artificial fibers, synthetic fibers, synthetic rubbers, polyvinyl alcohol, aramids, fluorofibers and phenolics.

\* \* \* \* \*